United States Patent
Ho

(10) Patent No.: US 8,185,153 B1
(45) Date of Patent: *May 22, 2012

(54) APPARATUS AND METHOD FOR A WEB PROGRAMMABLE TELEPHONE

(75) Inventor: Chi Fai Ho, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/900,310

(22) Filed: Oct. 7, 2010

Related U.S. Application Data

(63) Continuation of application No. 12/179,269, filed on Jul. 24, 2008, now Pat. No. 7,835,765.

(51) Int. Cl.
*H04M 1/00* (2006.01)

(52) U.S. Cl. .......... 455/552.1; 455/90.1; 455/90.2; 455/556.1; 379/88.17

(58) Field of Classification Search .......... 455/556, 455/557, 90.1, 90.2, 414.1, 552.1; 379/88.17
See application file for complete search history.

(56) References Cited

U.S. PATENT DOCUMENTS

| | | | |
|---|---|---|---|
| 6,337,858 B1 * | 1/2002 | Petty et al. .................. | 370/356 |
| 6,707,811 B2 * | 3/2004 | Greenberg et al. ........... | 370/352 |
| 2008/0310399 A1 * | 12/2008 | Narayanan et al. .......... | 370/352 |

* cited by examiner

*Primary Examiner* — Temica M Beamer
(74) *Attorney, Agent, or Firm* — North Shore Patents, P.C.; Michele Liu Baillie

(57) ABSTRACT

A web programmable telephone and a method for operating a web programmable telephone are disclosed. In one embodiment of the present invention, a voice module of a wireless household telephone is controlled by an internal web module that can retrieve and execute data operations from a remote portal or server thus adding data functionality to the conventional functions of a telephone. The programmable web module controls all functionality of the web programmable telephone so that every function of the telephone can be programmed and customized by a user.

27 Claims, 7 Drawing Sheets

Web Module

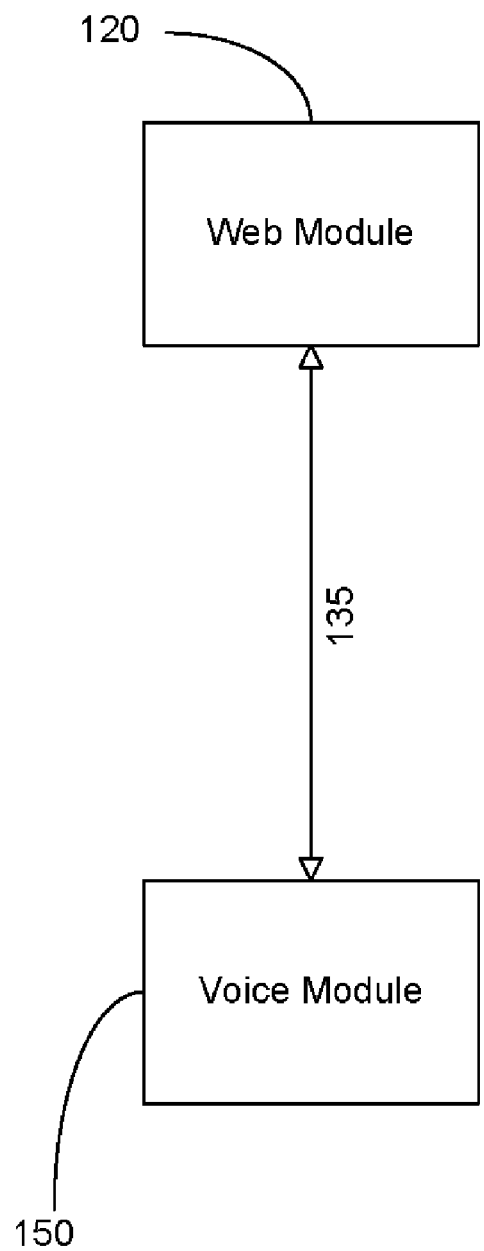
Figure 1. Web-controlled Phone

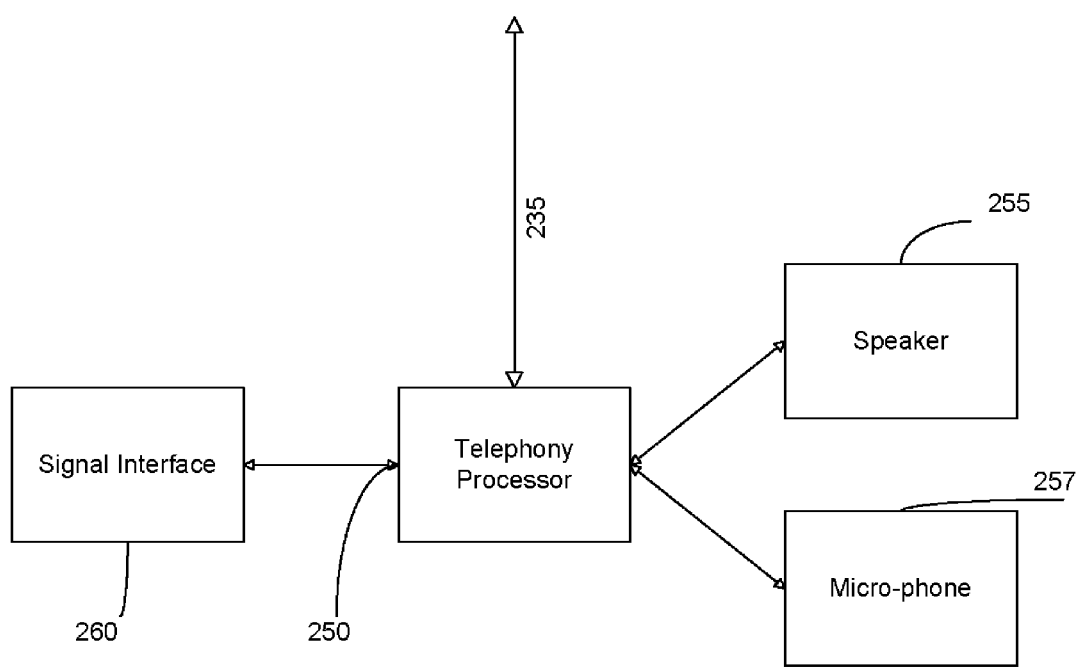
Figure 2. Voice Module

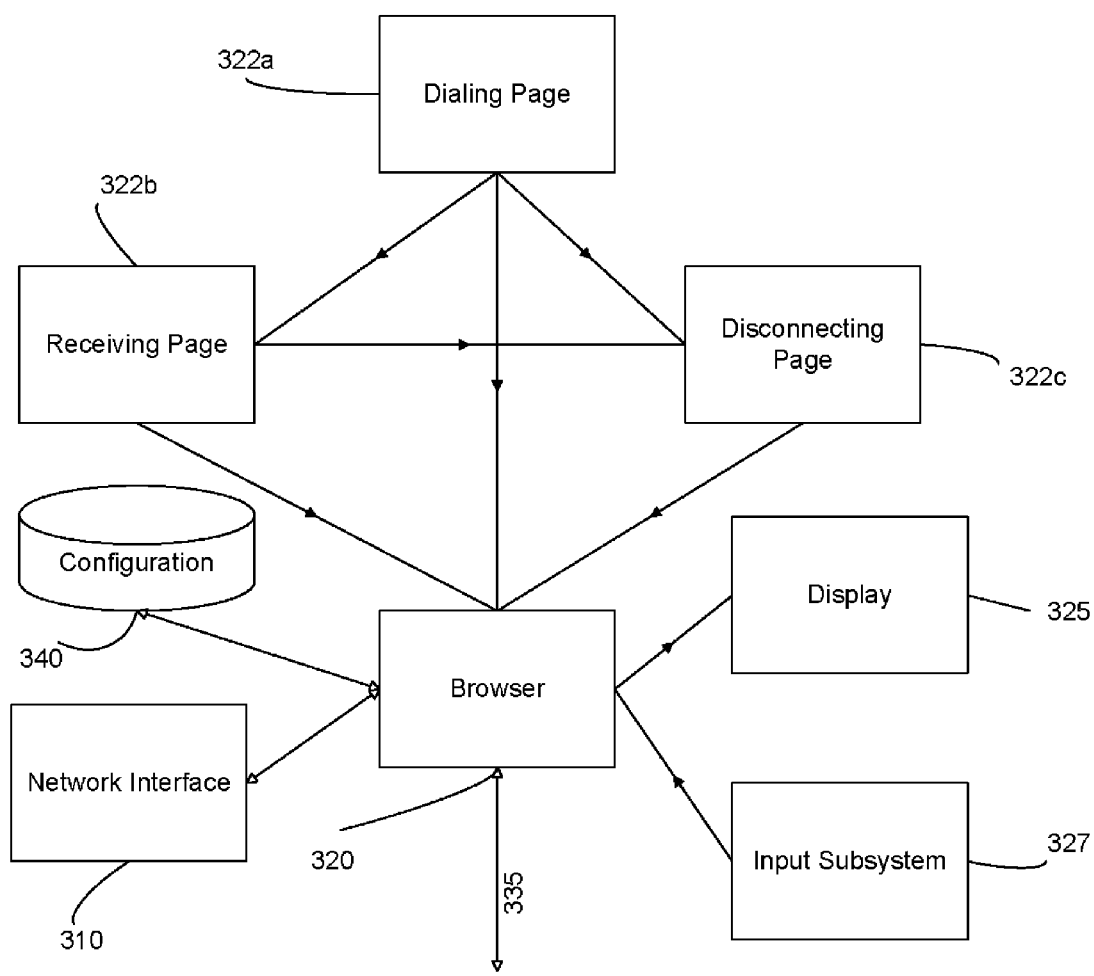
Figure 3. Web Module

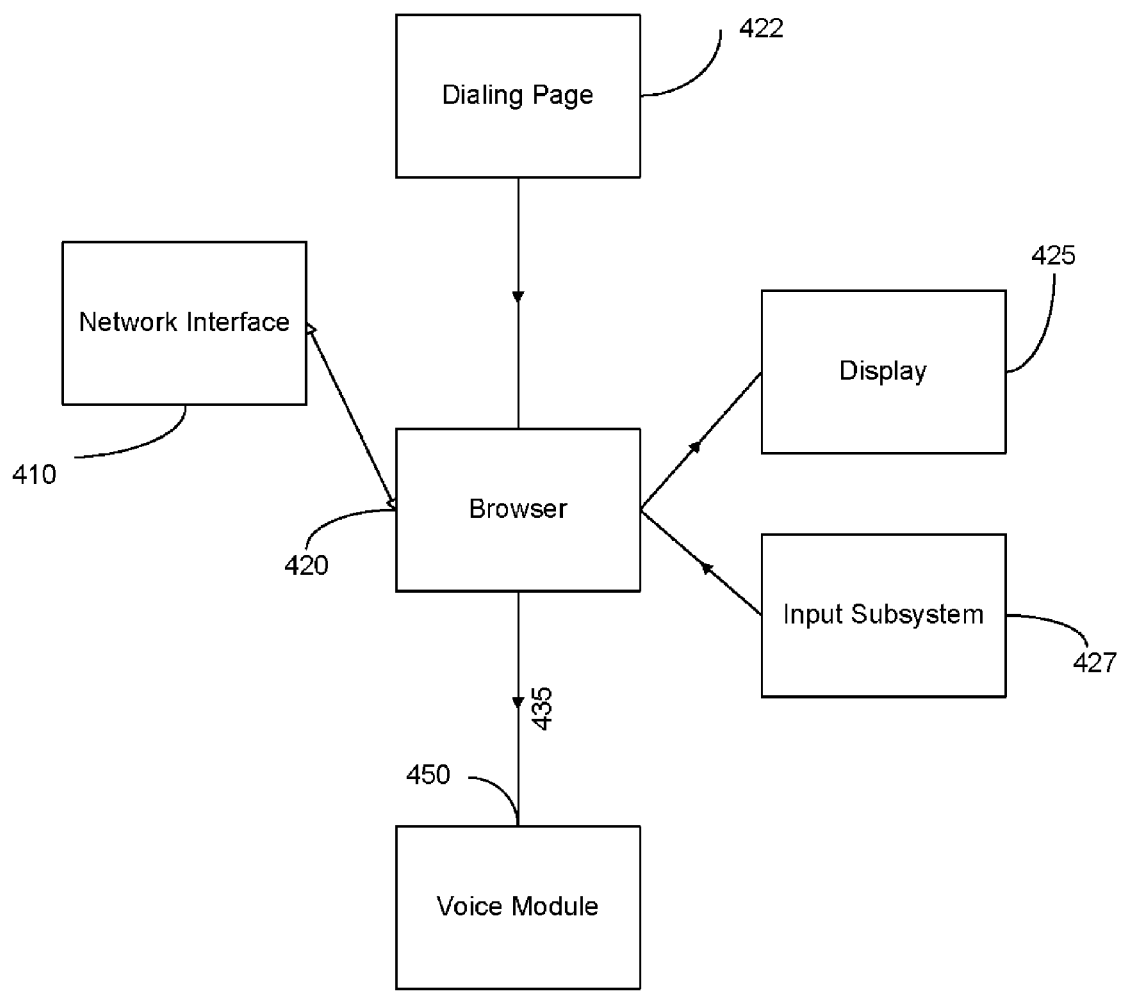
Figure 4. Making a Call

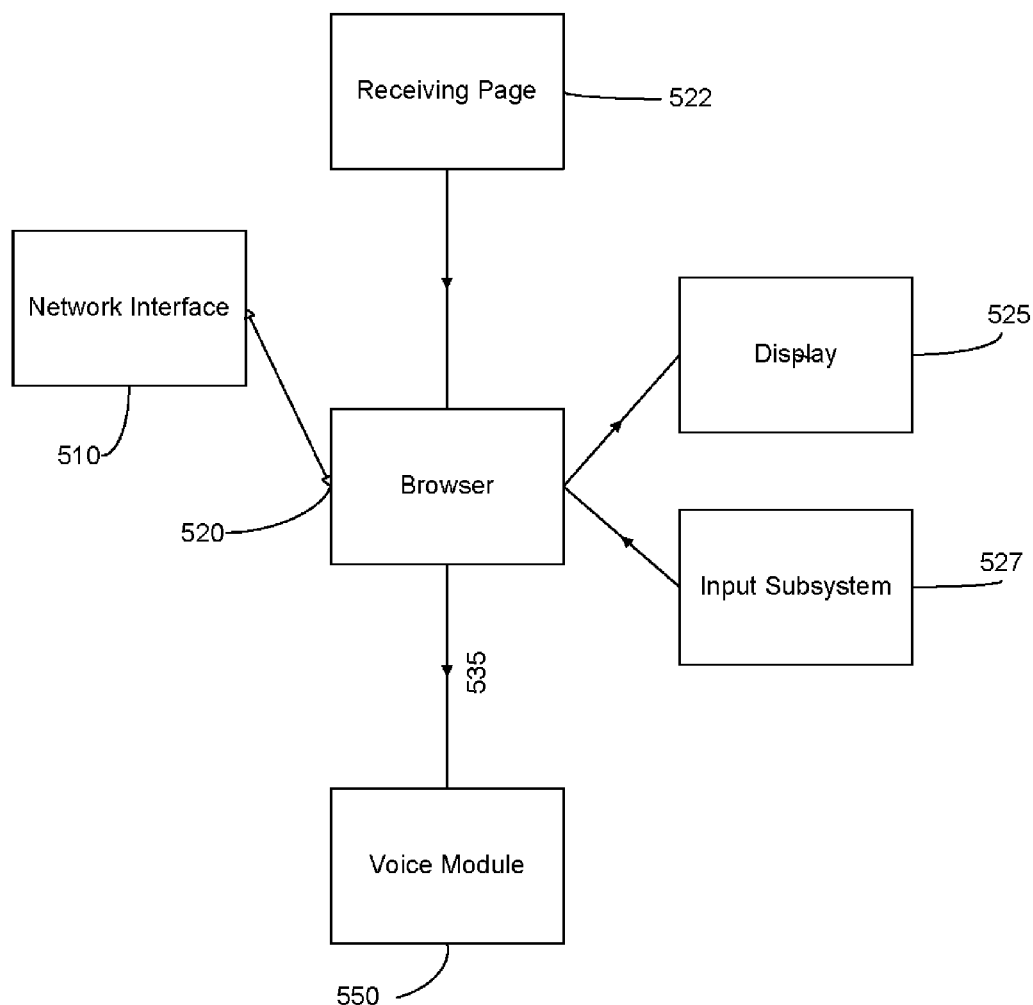
Figure 5. Receiving a Call

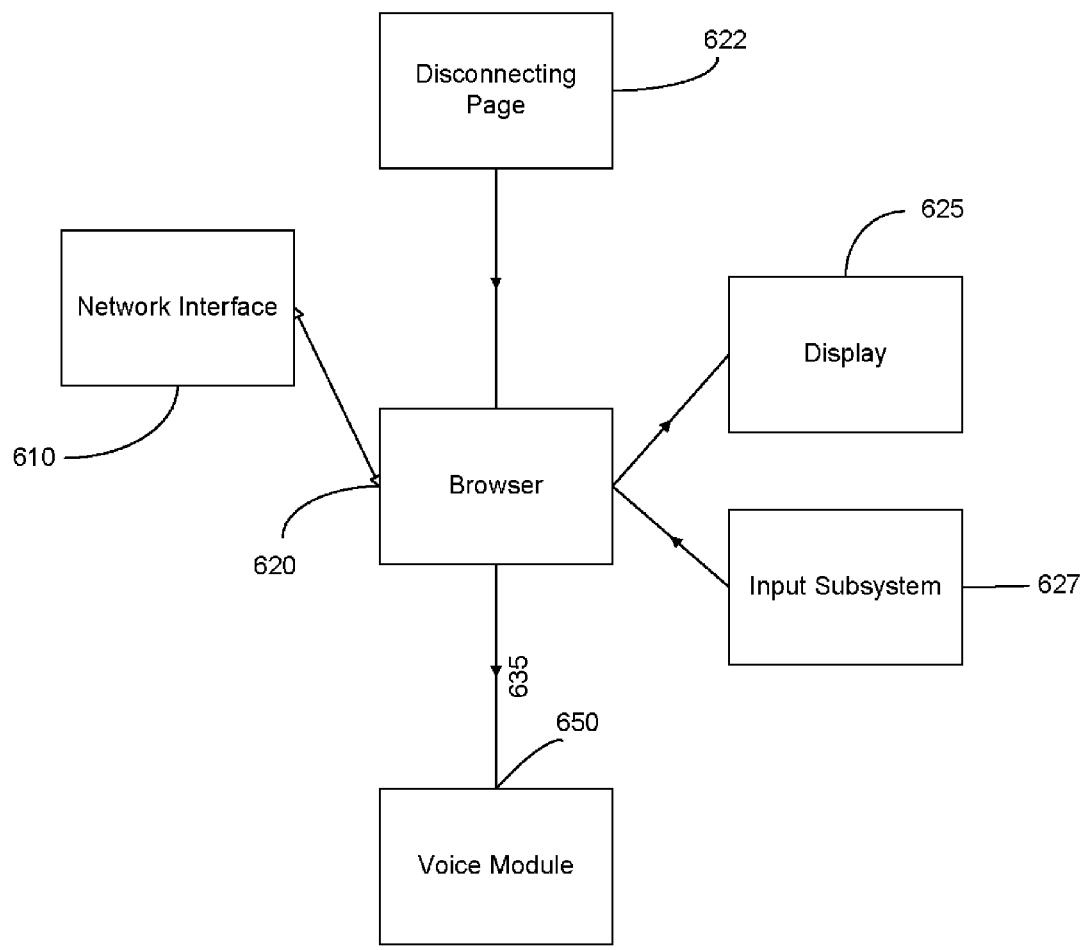
Figure 6. Dropping a Call

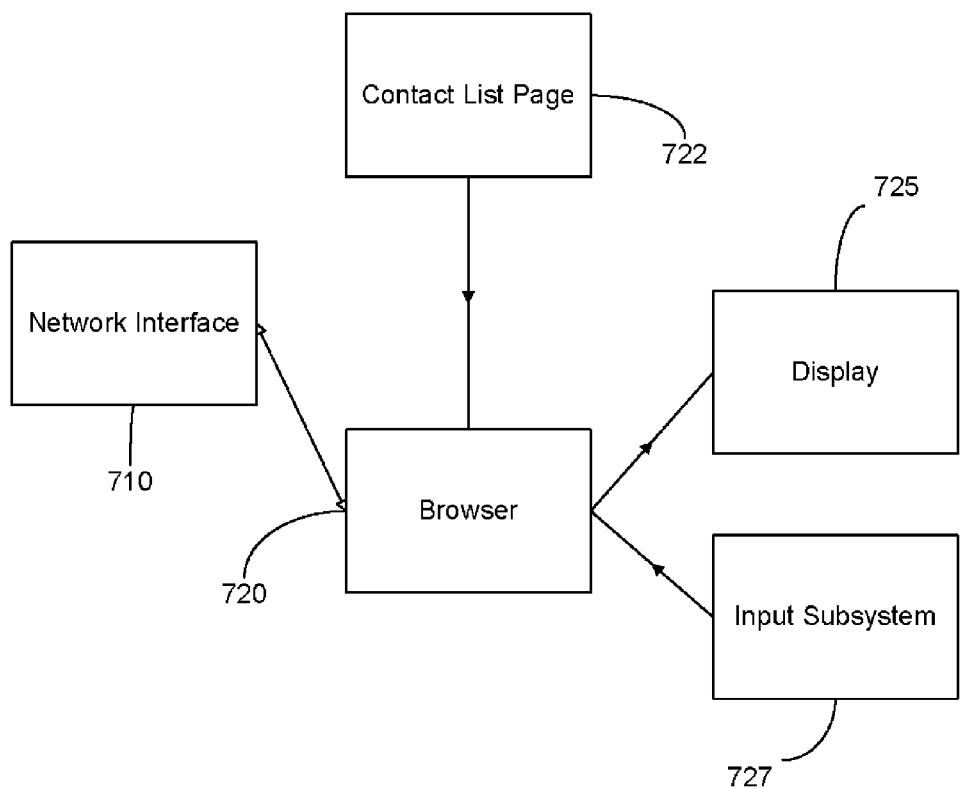
Figure 7. Accessing Contact List

APPARATUS AND METHOD FOR A WEB PROGRAMMABLE TELEPHONE

CROSS-REFERENCE TO RELATED APPLICATIONS

This application is a continuation of U.S. patent application Ser. No. 12/179,269, filed on Jul. 24, 2008, which in turn is a continuation of U.S. patent application Ser. No. 11/001,407, filed on Nov. 30, 2004, issued as U.S. Pat. No. 7,613,477.

BACKGROUND OF THE INVENTION

1. Field

This invention relates generally to telecommunications, more specifically, to an apparatus combining a web module and a voice module, allowing the web module to control the voice module to establish voice functionality such as making a call, receiving a call, dropping a call, accessing a contact list and more sophisticated data functionality.

2. Related Art

Cordless telephones have become a commodity household item. The convenience and flexibility provided by a telephone handset not physically attached to a telephone jack or an electrical outlet fits well with modern life. In addition, the price of cordless telephones has been declining steadily while the quality has been improving. Nevertheless, cordless telephones are primarily designed for voice communication. Their ability to handle data is extremely limited. The most common data application with current cordless telephones is limited to simple memory-stored speed-dial numbers.

As consumers grow more technologically savvy, they are continuously seeking more sophisticated integration of voice, data and other features to make life more convenient and productive. The trend is apparent in mobile voice services as well as entertainment devices such as MP3 music players and portable video players. Currently cellular telephones are fully capable of supporting voice communication features such as voice tags as well as data applications such as text, picture, and video messaging and Internet browsing. The differences in capabilities between household telephones and cellular telephones represent an interesting contrast of otherwise similar modern conveniences. Therefore there is a need for a household telephone with data technologies to be in par with other integrated data and voice technologies.

BRIEF SUMMARY OF THE INVENTION

This invention resides in an apparatus and method to make and operate a web programmable telephone. A programmable module that is linked to a remote server or portal controls all conventional telephone functionality of a voice module. Additionally, sophisticated programmable functionality can be added to a telephone by enabling a web interface capable of retrieving, loading and executing programs from remotely stored web pages. Such added data functionality includes, but is not limited to, interactive multimedia interface, home control and security interface, and more sophisticated telephone operations such as display of detailed caller information.

BRIEF DESCRIPTION OF THE SEVERAL VIEWS OF THE FIGURES

FIG. 1 is a block diagram illustrating a web programmable telephone.

FIG. 2 is a block diagram illustrating a voice module portion of a web programmable telephone.

FIG. 3 is a block diagram of a web module portion of a web programmable telephone.

FIG. 4 is a block diagram of making a telephone call with a web programmable telephone.

FIG. 5 is a block diagram of receiving a telephone call with a web programmable telephone.

FIG. 6 is a block diagram of dropping a call with a web programmable telephone.

FIG. 7 is a block diagram of accessing a contact list page with a web programmable telephone.

DETAILED DESCRIPTION OF THE INVENTION

FIG. 1 shows a web programmable telephone. The web programmable telephone has two major modules: web module 120 and voice module 150. Web module 120 controls the functionalities of the voice module 150 through a controlling interface 135. The functionalities of the voice module 150 include, but are not limited to making a call, receiving a call, and dropping a call. Other functions such as call conferencing, voice mail, and interactive voice response can be implemented similarly by those skilled in the art, upon reviewing the illustrations.

In one embodiment, the controlling interface 135 is Telephony Application Programming Interface (TAPI).

In one embodiment, the voice module 150 combines the Media Service Provider (MSP) and the Telephony Service Provider (TSP).

In one embodiment, the controlling interface 135 presents the call-controlling interface similar to that of Q.931.

In one embodiment, the controlling interface 135 is a CTI or CTI-equivalent interface. The implementation of the controlling interface 135 should be obvious to those skilled in the art.

FIG. 2 illustrates a voice module comprising a telephony processor 250, a speaker 255, a microphone 257 and a signal interface 260. During a telephone session, audio signals are received from the user by the microphone 257 and transmitted to the signal interface 260. Simultaneously signals are received by the signal interface 260 and output through speaker 255.

The telephony processor 250 can apply different processing to the audio signals received from the microphone 257 and the signals received from the signal interface 260, depending on the different types of signal interface 260.

In one embodiment, the signal interface 260 is a digital signal interface DS0. The telephony processor 250 performs analog-to-digital conversion on the audio signals from the microphone 257, and digital-to-analog conversion on the signals from the signal interface 260.

In one embodiment, the signal interface 260 is a wireless interface supporting 900 MHz, 2.4 GHz, 5.8 GHz, and DECT frequency. These are typical spectrum for cordless telephones. Other equivalent frequencies can also serve as the signal interface 260.

In one embodiment, the signal interface 260 is a voice over IP interface. The telephony processor 250 converts the analog audio signals to digital format; formats the bits into proper RTP (Real Time Protocol) packets and transmits the packets in an IP network. In the reverse direction, the telephony processor 250 receives the IP packets from the signal interface 260, extracts the RTP packets, further extracts the digital signals within the RTP packets, applies jitter and packet loss control, converts the digital signals into analog signals, and plays the analog signals onto the speaker.

In one embodiment, the telephony processor 250 compresses the digital content before formatting into RTP packets, and decompresses the content from the RTP packets. The telephony processor 250, the speaker 255, the microphone 257 and the signal interface 260 are common in the telecommunications industry. Implementation of such should be known to those skilled in the art.

FIG. 3 illustrates a web module. In one embodiment the web module contains a browser 320, which communicates to a web server using HTTP and other web protocols including but not limited to secure HTTP and FTP.

In one embodiment, the browser 320 is a Java run time engine, which communicates to other Java run time engines through Java specific and recommended protocols such as RMI, JINI, and LDAP.

In one embodiment, the browser 320 is a .NET environment. The browser 320 connects to the display 325 for presenting the web page content. There are different possible types of displays, including text display, graphical display, monochrome and color.

Optionally, display 325 may include a speaker or an audio-out jack for playing audio content. With audio capability, a web programmable telephone can be used to play music files from a central music file server. A web programmable telephone can be programmed to receive and decode music files from a server through network interface 310 and played on the optional speaker or audio-out jack of display 325.

Optionally, a web programmable telephone can be programmed to play music broadcast from a central portal to the signal interface 260 and played on the speaker 255 or an optional audio-out jack capable of be coupled to external speakers or audio system.

In one embodiment, a web programmable telephone can be programmed to act as room monitor wherein microphone 257 sends audio signals to telephony processor 250 for appropriate processing which then broadcast the signal through signal interface 260 to a central portal or another web programmable telephone as needed.

In one embodiment, a web programmable telephone can be use both network interface 310 and signal interface 260 to act as a multimedia interface to files on a central server. In such an embodiment, single-player and multi-player games could be played where the visual and controller data can be handled by the web-module 120 and the audio content is delivered through voice module 150.

In one embodiment, a web programmable telephone can be programmed to act as a home security interface providing for data code transmission through input subsystem 327 of web module 120 and optional added voice recognition security capabilities through voice module 150.

In one embodiment, a web programmable telephone can be used to browse the Internet. Browser 320 can run an Internet browsing page in which a user can enter a desired domain name or IP address of a website through input subsystem 327 and the browser would then retrieve data from a website through network interface 310. The data can then be displayed on display 325 or played on either an optional speaker built into display 325 or played on speaker 255 of the voice module of the web programmable telephone.

In one embodiment, there is no visual display. Web page content is played to the speaker only. The browser 320 receives user input from the input subsystem 327. The input subsystem 327 may include a keypad, a keyboard, a touch screen, a touch screen for use with a stylus for input, or a microphone. Furthermore the browser 320 accesses the data store 340 for configurations and other data.

The network interface 310 connects the browser 320 to other computing devices in one or more networks. The network interface 310 includes one or more network access methods, including but not limited to wired network such as Ethernet or wireless networks such as CDMA 1x, GPRS, 3GPP, Bluetooth, infra-red, Wi-Fi. The network interface 310 contains the necessary protocol stacks to communicate with other computing devices so that a communication session can be established between the browser 320 and a computing server.

In one embodiment, the browser 320 is a Web browser and a computing server is a Web server. The network interface 310 accesses the data store 340 for configuration and other data.

FIG. 3 illustrates a web module where the browser 320 is a web browser. The browser 320 connects to the web servers through the network interface 310. Configuration and other data necessary for normal operation of the browser are found in the data store 340.

The typical telephone functions such as making a telephone call, receiving a telephone call and dropping a telephone call are handled by the three web pages dialing page 322*a*, receiving page 322*b* and disconnecting page 322*c* respectively. The processing of these pages is illustrated later in this description.

When the web programmable telephone is powered on, browser 320 is initialized which then initializes the web module 120. The browser 320 determines from the configuration stored in data store 340 the location of the web server.

In one embodiment, the browser 320 receives the web server information from the network interface 310.

In one embodiment, the user selects one web server when there are many web servers capable of serving the web programmable telephone.

After the web programmable telephone is initialized, the browser 320 gets the receiving page 322*b* from the web server. The main function of the receiving page 322*b* is to receive a call. The processing of receiving a call is illustrated in FIG. 5. Upon successful receipt of an incoming call, the receiving page 322*b* instructs the browser 320 to get the disconnecting page 322*c* from the web server. The main function of the disconnecting page 322*c* is to drop a call. The processing of dropping a call is illustrated in FIG. 6. After the telephone call is dropped, the browser 320 gets the receiving page 322*b* from the web server in order to receive the next telephone call. When a user directs the web programmable telephone to make a call, the browser 320 gets the dialing page 322*a* from the web server. The main function of dialing page 322*a* is to make a call. The processing of making a call is illustrated in FIG. 4. Upon success of making a call, the browser 320 gets the disconnecting page 322*c* from the web server in order to drop a call.

Typically the web module 120 will cycle through the processing of the dialing page 322*a*, receiving page 322*b* and disconnecting page 322*c* until the web programmable telephone is powered off.

In one embodiment, the web programmable telephone allows the user to access a contact list page from the web server. The browser 320 gets the contact list page from the web server. An example of processing a contact list page is illustrated in FIG. 7.

In one embodiment, the web programmable telephone supports other voice functionalities such as voice mail, teleconferencing, and call forwarding. Additional web pages can be obtained from the web server. The browser 320 will obtain these web pages as instructed by other web pages. These web pages employ the programmability of the HTML, XML, Java, JavaScript and other hypertext and scripting languages supported by the browser 320, as well as the programmability of the controlling interface 335.

In one embodiment, the receiving page 322b, after accepting the telephone call, instructed the browser 320 to get the disconnecting page 322c. In the same embodiment, the disconnecting page 322c instructs the browser 320 to get the receiving page 322b when the telephone call is terminated. While the browser 320 is displaying the receiving page 322b, the receiving page 322b receives the input that the user picks up the telephone, and instructs the browser 320 to get the dialing page 322a.

In one embodiment, the receiving page 322b displays a "Call" button. Upon receiving a user input of the selection of the "Call" button, the receiving page 322b instructs the browser 320 to get the dialing page 322a.

FIG. 4 illustrates the process of dialing a call. When a user is ready to make a call, the browser 420 gets the dialing page 422. In one embodiment, the dialing page 422 displays a number pad on the display 425 and waits for the user to enter the calling telephone number. When the user inputs the entire calling telephone number, the dialing page 422 receives it from the input subsystem 427. The dialing page 422 invokes the controlling interface 435 to play a dial tone.

In embodiment, the dialing page 422 plays the dial tone as soon as it is loaded into the browser. Optionally, the dialing page 422 plays the dial tone after it receives partially or completely the input. Then the dialing page 422 invokes the controlling interface 435 to initiate a telephone call to the calling telephone number. Upon receiving the completion indication of the telephone call initiation from the controlling interface 435, the dialing page 422 asks the browser to get the disconnecting page 622.

Optionally, dialing page 422 will include an option to dial two or more telephone numbers for the purpose of conducting a teleconference call.

Optionally, a separate teleconferencing page that can be called from dialing page 422 can handle teleconferencing. The teleconferencing page can be implemented in a number of ways depending on the telephony system to which the web programmable telephone is connected.

In one embodiment, the web programmable telephone is connected to two or more distinct telephone lines and the teleconferencing page would place a call to two or more of those lines such that one or more of the people called can participate in the teleconference conversation.

In one embodiment, the web programmable telephone is connected to a telephone system that controls the teleconferencing. The teleconferencing page would provide the telephone numbers to the telephone system such that one or more of the people called could participate in the telephone conversation.

Optionally, the teleconferencing page can designate which of the telephone numbers called for a teleconference will have full or limited participation in the teleconference call. In the case that the number called is designated as a full participant in the teleconference, then the person called on that number would be able to hear and respond to every other person in the teleconference. In the case that the number called is designated as a limited participant in the teleconference, then the person called on that number would only be able to hear or respond to a limited number of teleconference participants.

Optionally, the dialing page 422 will include an option to dial into the either a service provider voice mail system or connect to a telephone answering machine.

In one embodiment, the dialing page 422 contains an option for the user to choose a telephone number from a contact list. When the user selects the option, the dialing page 422 asks the browser to load the contact list page 722. The processing of the contact list page 722 is described later in FIG. 7.

In one embodiment, the browser loads the dialing page 422 with a default calling telephone number. The user confirms the calling telephone number. The dialing page 422 proceeds to make the telephone call as described above. This embodiment is used, for example, after the user selects the calling telephone number from the contact list page 722.

Optionally, the dialing page 422 automatically makes the telephone call with the default calling telephone number, without asking the user for confirmation.

Optionally, the dialing page 422 invokes the controlling interface 435 to play the dial tone before prompting the user for the calling telephone number or confirmation.

Optionally, the dialing page 422 does not play the dial tone.

FIG. 5 illustrates the process of receiving a call. The receiving page 522 listens to events from the controlling interface 535. In one embodiment, the receiving page 522 registers with the controlling interface 535 on incoming call indication event. Upon receiving an incoming call indication from the signal interface 260, the voice module 550 informs, through the controlling interface 535, the receiving page 522 of an incoming call event.

In one embodiment, the incoming call indication includes information about the caller. The incoming call information includes, for example, the caller identity. Upon receipt of the incoming call indication from the controlling interface 535, the receiving page 522 retrieves any given incoming call information indicated by the controlling interface 535.

In one embodiment, the receiving page 522 invokes the controlling interface 535 to play a ring tone.

In one embodiment, the receiving page 522 uses the incoming call information such as the caller identity or the calling telephone number to determine a ring tone to play.

In one embodiment, the receiving page displays an incoming call indication to the display 525. The display can be a flashing LED light. The display can also be an icon or a digital image on the display 525.

In one embodiment, the display includes the caller information such as caller identity.

The receiving page 522 waits for the user to pick up the web programmable telephone to answer the incoming call.

In one embodiment, when a user picks up the web programmable telephone the receiving page 522 immediately turns off the display of an incoming call indication. It then invokes the controlling interface 535 to accept the telephone call.

In one embodiment, the receiving page 522 only displays an incoming call LED. When a user picks up the web programmable telephone, the receiving page 522 displays the incoming call information.

In one embodiment, the receiving page 522 posts a query using the incoming call information to a web server. The web server may have a telephone directory containing names, addresses and other personal and business information about the caller. The web server responds to the query with the found additional information. The receiving page 522 displays the information to the display 525.

In one embodiment, the receiving page 522 asks the browser to load a different receiving page that contains the additional caller information. Upon reviewing the additional caller information, the user confirms to accept the telephone call. The receiving page 522 then invokes the controlling interface 535 to receive the telephone call.

While the receiving page 522 is waiting for an incoming call, if the user picks up the web programmable telephone, the receiving page 522 asks the browser to load the dialing page 422. In another embodiment, the user presses the on-button to indicate to the receiving page 522 to ask the browser to load the dialing page 422.

FIG. 6 illustrates the process of dropping a call. While a user is conducting a telephone call, the web programmable telephone is running the disconnecting page 622. The disconnecting page 622 continuously waits for the user to drop the call. When the user desires to drop the call, the user selects the "Off" button in the input subsystem.

In one embodiment, the user touches an "Off" button on input subsystem 627. When the disconnecting page 622 receives the input from the input subsystem 627, it invokes the controlling interface 635 to disconnect the telephone call.

There are a number of embodiments to handle the possible scenario in which the other party drops a call first.

In one embodiment the disconnecting page 622 does not detect the situation. The user eventually realizes the other party is no longer on the telephone call. The user presses the off-button to drop the call. The disconnecting page 622 proceeds the processing as described previously.

In one embodiment, the voice module 650 monitors the call and detects a long silence period. The voice module 650 determines the other party has either dropped the call or has no interests in continuing the call. The voice module 650 indicates to the disconnecting page 622 of the dropped call event. The disconnecting page 622 displays the indication of the dropped call event to the user and prompts the user to then proceed to drop the call as described above.

In one embodiment, telephone being called is connected to a telephone system that will generate a disconnect signal, such as a dial tone. The voice module 650 detects the disconnect signal or indication through the signal interface 260 and further indicates to the disconnecting page 622 through the controlling interface 635 that the call has been disconnected. The disconnecting page 622 indicates to the user of the call drop and prompts the user to drop the call as described above.

In one embodiment, the disconnecting page 622 invokes the controlling interface 635 to ask the voice module to disconnect the call. The disconnecting page 622 then informs the user that the call is dropped. After the call is disconnected, the disconnecting page 622 asks the browser to load the receiving page 522 to wait for an incoming call.

FIG. 7 illustrates the process of accessing a telephone list. It is often convenient for the user to use his contact book to find a telephone number before dialing it.

In one embodiment, there is an option on the dialing page 422 for the user to access a telephone list. When the user selects the telephone list option the browser 720 will load the contact list page 722 from a web server through the network interface 710. The user navigates the contact list page 722 and selects a number to dial. The contact list page 722 asks the browser 720 to load the dialing page 422 with the calling telephone number. The dialing page 422 then prompts the user to confirm the number and makes the call as illustrated in FIG. 4.

In one embodiment, the dialing page 422, without prompting user confirmation, automatically makes the call as illustrated in FIG. 4.

In one embodiment, the contact list page 722 allows the user to make modification to the contact list page entries by accepting user input from the input subsystem. The modification is posted by the browser 720 to a web server specified in the contact list page 722. Such implementation should be obvious to those skilled in the art.

In the above illustrations, the web programmable telephone is used to make regular telephone calls. In one embodiment, a web programmable telephone is used only for receiving calls. Receiving page 522 does not perform any action to make a call when the user picks up the telephone.

Optionally, receiving page 522 displays no options for the user to make a call. In such an embodiment, it is possible to combine the receiving page 522 and the disconnecting page 622 into a single page.

In one embodiment, the web programmable telephone is used only for making calls. The receiving page 522 always rejects incoming calls indicated by the controlling interface 535.

In one embodiment, the web programmable telephone supports multiple lines and can handle two telephone calls simultaneously. The browser 320 runs multiple pages simultaneously. A user can make a telephone call using the dialing page 422, while on another call using the disconnecting page 622.

In one embodiment, there are multiple executing instances of the browser 320 handling the multiple pages.

In one embodiment, the browser 320 handles the multiple pages by having multiple processing threads. In such an embodiment, the user is on a call conducting the telephone conversation while browser 320 is displaying the disconnecting page 322c in one processing thread, another processing thread of the browser 320 is processing the receiving page 322b. When incoming call event occurs, receiving page 322b instructs the browser 320 to alert the user of an incoming call. An option to instruct browser 320 to switch to the receiving page 322b is displayed. Receiving page 322b would then display an option to accept or to decline the call.

In one embodiment, the user can access the contact list page 722 while she is conducting a telephone conversation.

In a different embodiment, the browser 320 handles a plurality of processing threads, allowing the user to handle a plurality of simultaneous activities.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A web programmable telephone comprising:
    a voice module for performing one or more telephone functions, wherein the one or more telephone functions comprise a receiving a call function; and
    a web module for obtaining one or more web pages containing executable instructions, wherein execution of the instructions causes the voice module to perform the receiving a call function.

2. The web programmable telephone of claim 1, wherein the web module comprises a browser, wherein the browser is capable of executing the instructions contained in the one or more web pages, wherein the browser is capable of communicating with a Web server using HTTP, FTP, or other web protocols.

3. The web programmable telephone of claim 1, wherein the web module comprises a browser, wherein the browser is capable of executing the instructions contained in the one or more web pages, wherein the instructions comprise HTML, XML, JavaScript, or other scripting language.

4. The web programmable telephone of claim 1, wherein the instructions comprise Java programming instructions, wherein the execution of the Java programming instructions causes the voice module to perform the receiving a call function.

5. The web programmable telephone of claim 1, wherein the execution of the instructions further causes the voice module to listen for an incoming call event and to receive an incoming call indication from a signal interface.

6. The web programmable telephone of claim 5, wherein the incoming call indication comprises a caller identity or a caller telephone number of the incoming call.

7. The web programmable telephone of claim 1, wherein the execution of the instructions further causes the voice module to invoke an acceptance of an incoming telephone call in response to a user answering the incoming call.

8. The web programmable telephone of claim 7, wherein the execution of the instructions further causes the voice module to display information about a caller of the incoming call prior to the user answering the incoming call.

9. The web programmable telephone of claim 8, wherein the execution of the instructions further causes the web module to load a different web page containing additional caller information.

10. The web programmable telephone of claim 1, wherein the execution of the instructions further causes the voice module to perform a making a call function.

11. A method for operating a web programmable telephone, comprising:
   obtaining one or more web pages by a web module, the one or more web pages containing executable instructions for providing a receiving a call function; and
   executing the instructions contained in the one or more web pages, wherein the execution of the instructions causes a voice module to perform the receiving a call function.

12. The method of claim 11, wherein the web module comprises a browser, wherein the browser executes the instructions contained in the one or more web pages, wherein the browser is capable of communicating with a Web server using HTTP, FTP, or other web protocols.

13. The method of claim 11, wherein the web module comprises a browser, wherein the browser executes the instructions contained in the one or more web pages, wherein the instructions comprise HTML, XML, JavaScript, or other scripting language.

14. The method of claim 11, wherein the instructions comprise Java programming instructions, wherein the execution of the Java programming instructions causes the voice module to perform the receiving a call function.

15. The method of claim 11, wherein the execution of the instructions further causes the voice module to listen for an incoming call event and to receive an incoming call indication from a signal interface.

16. The method of claim 15, wherein the incoming call indication comprises a caller identity or a caller telephone number of the incoming call.

17. The method of claim 11, wherein the execution of the instructions further causes the voice module to invoke an acceptance of an incoming telephone call in response to a user answering the incoming call.

18. The method of claim 17, wherein the execution of the instructions further causes the voice module to display information about a caller of the incoming call prior to the user answering the incoming call.

19. The method of claim 18, wherein the execution of the instructions further causes the web module to load a different web page containing additional caller information.

20. A computer program product for operating a web programmable telephone, the computer program product comprising:
   a computer readable storage medium comprising one or more web pages embodied therewith, the one or more web pages containing executable instructions for providing a receiving a call function, the instructions configured to cause a voice module to perform a receiving a call function.

21. The medium of claim 20, wherein the instructions are further configured to communicate with a Web server using HTTP, FTP, or other web protocols.

22. The medium of claim 20, wherein the instructions comprise HTML, XML, JavaScript, or other scripting language.

23. The medium of claim 20, wherein the instructions comprise Java programming instructions configured to cause the voice module to perform the receiving a call function.

24. The medium of claim 20, wherein the instructions are further configured to cause the voice module to listen for an incoming call event and to receive an incoming call indication from a signal interface.

25. The medium of claim 24, wherein the incoming call indication comprises information about a caller of the incoming call.

26. The medium of claim 20, wherein the instructions are further configured to cause the voice module to invoke an acceptance of an incoming telephone call in response to a user answering the incoming call.

27. The medium of claim 26, wherein the instructions are further configured to cause the web module to load a different web page containing additional caller information.

* * * * *